(12) United States Patent
Callou et al.

(10) Patent No.: US 8,594,862 B2
(45) Date of Patent: Nov. 26, 2013

(54) METHOD FOR THE INTUITIVE PILOTING OF A DRONE BY MEANS OF A REMOTE CONTROL

(71) Applicant: Parrot, Paris (FR)

(72) Inventors: Francois Callou, Paris (FR); Gilles Foinet, Paris (FR)

(73) Assignee: Parrot, Paris (FR)

( * ) Notice: Subject to any disclaimer, the term of this patent is extended or adjusted under 35 U.S.C. 154(b) by 0 days.

(21) Appl. No.: 13/733,361

(22) Filed: Jan. 3, 2013

(65) Prior Publication Data

US 2013/0173088 A1 Jul. 4, 2013

(30) Foreign Application Priority Data

Jan. 4, 2012 (FR) ...................................... 12 50069

(51) Int. Cl.
*B64C 39/02* (2006.01)
(52) U.S. Cl.
USPC ........................................ 701/2; 701/3; 701/4
(58) Field of Classification Search
USPC ........ 701/2, 3, 4, 11, 13, 14, 23, 24, 36, 32.3, 701/32.4; 244/75, 76 R
See application file for complete search history.

(56) References Cited

U.S. PATENT DOCUMENTS

| | | | |
|---|---|---|---|
| 5,043,646 A | 8/1991 | Smith, III | |
| 5,552,983 A | 9/1996 | Thornberg | |
| 7,509,212 B2* | 3/2009 | Bodin et al. | ................... 701/528 |
| 8,103,398 B2* | 1/2012 | Duggan et al. | ................... 701/24 |
| 8,355,834 B2* | 1/2013 | Duggan et al. | ................... 701/24 |
| 2009/0204276 A1 | 8/2009 | Stuckman | |

FOREIGN PATENT DOCUMENTS

WO 2010/061099 A2 6/2010

* cited by examiner

*Primary Examiner* — Richard Camby
(74) *Attorney, Agent, or Firm* — Haverstock & Owens LLP

(57) ABSTRACT

The user inclines the apparatus (16) according to the pitch (32) and roll (34) axes to produce inclination signals ($\theta_I$, $\phi_I$) which are transformed into corresponding command setpoints ($\theta_d$, $\phi_d$) for the drone (10) in terms of attitude of the drone according to the pitch (22) and roll (24) axes of the drone. The drone and the apparatus each determine the orientation of their local reference frame ($X_I Y_I Z_I$; $X_b Y_b Z_b$) in relation to an absolute reference frame linked to the ground ($X_{NED} Y_{NED} Z_{NED}$), to determine the relative angular orientation of the drone in relation to the apparatus. Then, the reference frame of the apparatus is realigned on the reference frame of the drone by a rotation that is a function of this relative angular orientation. The realigned values thus correspond to user commands referenced in the reference frame of the apparatus and no longer in that of the drone, which allows for more intuitive piloting when the user is watching the drone.

11 Claims, 5 Drawing Sheets

METHOD FOR THE INTUITIVE PILOTING OF A DRONE BY MEANS OF A REMOTE CONTROL

The invention relates to the piloting of rotary wing drones such as quadricopters and similar.

These drones are provided with multiple rotors driven by respective motors that can be controlled in a differentiated manner in order to pilot the drone attitude-wise and speed-wise.

A typical example of such a drone is the AR.Drone from Parrot SA, Paris, France, which is a quadricopter equipped with a series of sensors (accelerometers, triaxial gyrometers, altimeter). The drone is also provided with a front-mounted camera picking up an image of the scene toward which the drone is directed, as well as a vertical sight camera picking up an image of the terrain being flown over.

This drone is piloted by the user by means of a separate remote control device—hereinafter called "apparatus"—linked to the drone by a radio link. WO 2010/061099 A2 and EP 2 364 757 A1 (Parrot SA) describe in particular such a drone and its principle of piloting via a telephone or portable multimedia device with touchscreen and integrated accelerometer, for example a cellular telephone of iPhone type or a portable device or multimedia tablet of iPod Touch or iPad type (registered trademarks of Apple Inc., USA). These apparatuses incorporate the various control members necessary for the detection of the piloting commands and bidirectional exchange of data with the drone via a wireless link of Wi-Fi (IEEE 802.11) or Bluetooth (registered trademarks) local area network type. They are furthermore provided with a touchscreen displaying the image picked up by the front-mounted camera of the drone, with, superimposed, a certain number of symbols making it possible to activate commands by simple finger-contact by the user on this touchscreen.

More specifically, the drone is piloted by the user by means of signals transmitted by the detector of inclinations of the apparatus, inclinations which will be replicated by the drone: for example, to move the drone forward, the user inclines his or her apparatus according to its pitch axis, and to shift the drone to the right or left, he or she inclines this same apparatus in relation to its roll axis. In this way, if the drone is controlled in such a way as to be inclined or "dive" downward (inclination according to a pitch angle), it will move forward with a speed that increases as the inclination increases; conversely, if it is controlled in such a way as to "pull up" in the opposite direction, its speed will slow down progressively then will be reversed by starting to move backward. Similarly, for an inclination command according to a roll axis, the drone will tilt to the right or left, provoking a linear horizontal translational displacement to the right or to the left.

The user has other commands displayed on the touchscreen, notably "climb/descend" (throttle control) and "pivot right/pivot left" (pivoting of the drone about its yaw axis).

The drone is also provided with a fixed point passage command: when the user releases all the commands of his remote control apparatus, the drone is immobilized and is stabilized at the fixed point, entirely automatically.

The display on the screen of the apparatus of the image picked up by the front-mounted camera of the drone, with, superimposed, the symbols of the piloting buttons, thus allows for an "immersive piloting" in which the user uses the image from the onboard camera in the same way as if he himself were on board the drone.

However, specifically, this piloting mode involves a certain amount of training before the user can "imagine himself in the drone" to control the latter, which is not the most intuitive way of piloting it for a beginner or a child. In practice, on first use, the user will have a tendency to keep his eyes fixed on the drone rather than on the screen of the apparatus.

Now, in this case, an additional difficulty emerges, which is that of having to mentally picture the orientation of the drone in relation to the user during piloting maneuvers.

When the direction of sight (user→drone) and the direction of progress of the drone are more or less the same—for example when the drone turns its back to the user and moves away therefrom—that does not pose any particular problem, because the pitch/roll commands on the apparatus are replicated on the drone, for which the pitch/roll axes of the drone are oriented in the same way.

On the other hand, when the drone faces the user moving toward him, these commands are reversed: to shift the drone to the left, the user will have to incline his apparatus to the right (and no longer to the left) and vice versa. Or else, when the direction of progress of the drone forms an angle with the direction of sight—for example when the drone is moving forward from left to right in front of the user—to speed up or slow down this movement from left to right the user will have to tilt the apparatus forward or backward, and not to the left or to the right as he sees the drone.

In other words, in this case, he will have to mentally reverse the roll of the pitch and roll inclinations, if he wants to control the movement of the drone by accompanying it with his apparatus.

The aim of the invention is to resolve this difficulty, by offering the user, notably the novice user, a piloting mode other than immersive piloting, which renders the drone easier to keep under control.

Essentially, the invention proposes to determine the respective orientations of the drone and of the apparatus in relation to a fixed reference frame linked to the ground, to deduce therefrom the relative orientation of the drone in relation to the apparatus, and to recompute the commands transmitted to the apparatus by the user in such a way that the axes (pitch/roll) of the commands and the orientations of these axes (front/rear, or left/right) taken into account for the piloting correspond to the axes and orientations of the apparatus in the fixed reference frame, and no longer to the axes and orientations, which are permanently variable, of the drone.

The user will then have a drone piloting mode that is independent of the actual orientation of said drone: thus, if for example the drone faces the user, the latter will be able to speed up the drone by tilting the apparatus toward him, make it go to the right by tilting the apparatus to the right, and so on, and therefore in a totally intuitive manner if he is looking at the drone (whereas in the "immersive piloting" mode, he would have had to reverse these commands). Similarly, if the drone is moving from left to right, he will be able to bring it closer by tilting the apparatus toward him, speed it up by tilting the apparatus to the right, and so on, in a very easy and spontaneous manner.

More specifically, the invention proposes a piloting method disclosed for example by WO 2010/061099 A2 mentioned above, namely a method for piloting a rotary wing drone with multiple rotors driven by respective motors that can be controlled in a differentiated manner to pilot the drone attitude-wise and speed-wise, comprising the following steps:

- by the apparatus: inclination of the apparatus according to the pitch and roll axes of this apparatus, and production of corresponding inclination signals, and transformation of these inclination signals of the apparatus into piloting commands and sending of these commands to the drone; and by the drone: reception of the piloting commands and generation from these commands of setpoint values for a drone motor control loop, these setpoint values being suitable for controlling the attitude of the drone according to the pitch and roll axes of the drone.

In a manner characteristic of the invention, this method comprises the following additional steps:

acquisition of first orientation data of a local reference frame linked to the apparatus in relation to an absolute reference frame linked to the ground;

acquisition of second orientation data of a local reference frame linked to the drone in relation to said absolute reference frame;

computation of a relative angular orientation datum of the drone in relation to the apparatus, from said first and second orientation data; and realignment of the reference frame of the apparatus on the reference frame of the drone, by application to the piloting commands of a rotation that is a function of said relative angular orientation datum.

In this way, realigned setpoint values according to the pitch and roll axes of the drone are produced which are a function of the inclinations, applied to the apparatus by the user according to the pitch and roll axes thereof, considered in the local reference frame linked to the apparatus and no longer in that linked to the drone.

The first and the second orientation data are advantageously obtained from respective heading angles of the apparatus and of the drone in relation to the north.

In a first implementation, simplified, the rotation that is a function of the relative angular orientation datum is of the type:

$$\begin{pmatrix} \theta_d \\ \varphi_d \end{pmatrix} = \begin{pmatrix} \cos\Delta\psi & \sin\Delta\psi \\ -\sin\Delta\psi & \cos\Delta\psi \end{pmatrix} \begin{pmatrix} \theta_I \\ \varphi_I \end{pmatrix}$$

$\theta_d$ and $\varphi_d$ being the realigned setpoint values according to the pitch and roll axes in the local reference frame linked to the drone, $\theta_I$ and $\varphi_I$ being the inclinations applied according to the pitch and roll axes in the local reference frame linked to the apparatus, and $\Delta\psi$ being the difference of the respective heading angles of the apparatus and of the drone in relation to the north.

This rotation computation is then advantageously performed within the drone, directly from data received from the apparatus, these data comprising the values of the inclinations applied to the apparatus and a heading angle datum of the apparatus.

In a second implementation, complete, the rotation that is a function of said relative angular orientation datum is of the type:

$$\begin{cases} \theta_d = \tan^{-1}\left[\cos\Delta\psi \cdot \tan\theta_I + \sin\Delta\psi \cdot \frac{\tan\varphi_I}{\cos\theta_I}\right] \\ \varphi_d = \sin^{-1}\left[\cos\Delta\psi \cdot \sin\varphi_I - \sin\Delta\psi \cdot \sin\theta_I \cdot \cos\varphi_I\right] \end{cases}$$

$\theta_d$ and $\varphi_d$ being the realigned setpoint values according to the pitch and roll axes of the drone, $\theta_I$ and $\varphi_I$ being the inclinations applied according to the pitch and roll axes of the apparatus, and $\Delta\psi$ being the difference of the respective heading angles of the apparatus and of the drone in relation to the north.

The rotation computation can then be performed partially within the apparatus and partially within the drone with:

within the apparatus, computation of a first rotation from the values of the inclinations $\theta_I$ and $\varphi_I$ applied to the apparatus and of a heading angle datum $\psi_{iP}$ of the apparatus:

$$\begin{pmatrix} \theta'_I \\ \varphi'_I \end{pmatrix} = \begin{pmatrix} \cos\psi_{iP} & \sin\psi_{iP} \\ -\sin\psi_{iP} & \cos\psi_{iP} \end{pmatrix} \begin{pmatrix} \theta_I \\ \varphi_I \end{pmatrix}$$

within the drone, computation of a second rotation from a heading angle datum $\psi_{drone}$ of the drone:

$$\begin{pmatrix} \theta_d \\ \varphi_d \end{pmatrix} = \begin{pmatrix} \cos\psi_{drone} & -\sin\psi_{drone} \\ \sin\psi_{drone} & \cos\psi_{drone} \end{pmatrix} \begin{pmatrix} \theta'_I \\ \varphi'_I \end{pmatrix}$$

Generally, the absolute reference frame linked to the ground is preferably a geomagnetic reference frame, the heading angles being angles measured in relation to the magnetic north.

The determination of the heading angle of the drone then comprises the acquisition of a magnetic heading measurement delivered by a magnetometric sensor of the drone.

In particular, the heading angle of the drone can be acquired by the combination: of a magnetic heading measurement delivered by a magnetometric sensor of the drone with application of a low-pass filtering; and of a gyroscopic heading measurement delivered by an inertial unit of the drone with application of a high-pass filtering complementing said low-pass filtering.

The method advantageously comprises a preliminary step of calibration of the magnetometric sensor of the drone, with the substeps of:

ordering a complete rotation of the drone in flight, flat around a yaw axis;

recording of the measurements delivered by the magnetometric sensor; and determination of a global offset value representative of the surrounding disturbing magnetic fields and of the specific offset of the magnetometric sensor.

There now follows a description of an exemplary implementation of the invention, with reference to the appended drawings in which the same numeric references designate, from one figure to another, identical or functionally similar elements.

Figure 7:
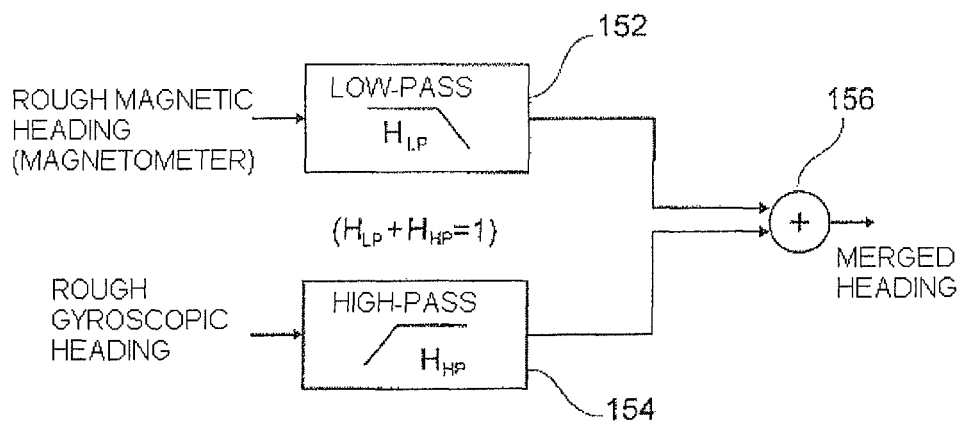

FIG. 7 schematically illustrates how to combine the magnetic field orientation information obtained by a magnetometer and by the gyroscopic unit of the drone.

Figure 8:
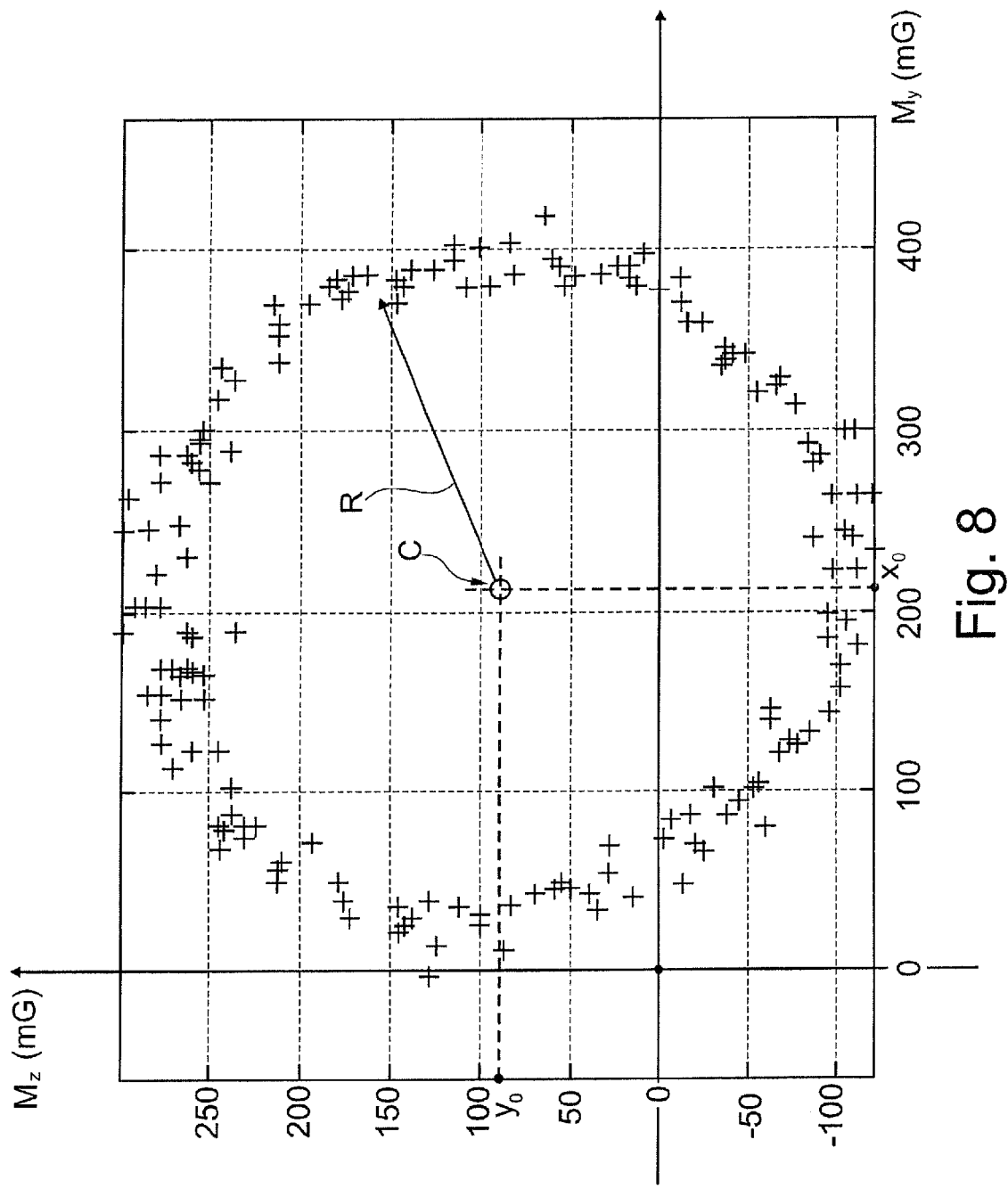

FIG. 8 illustrates the recordings of the magnetometric measurements during a complete rotation of the drone on itself, in the context of the preliminary magnetometer calibration procedure, according to the invention.

There now follows a description of an exemplary implementation of the invention.

Figure 1:
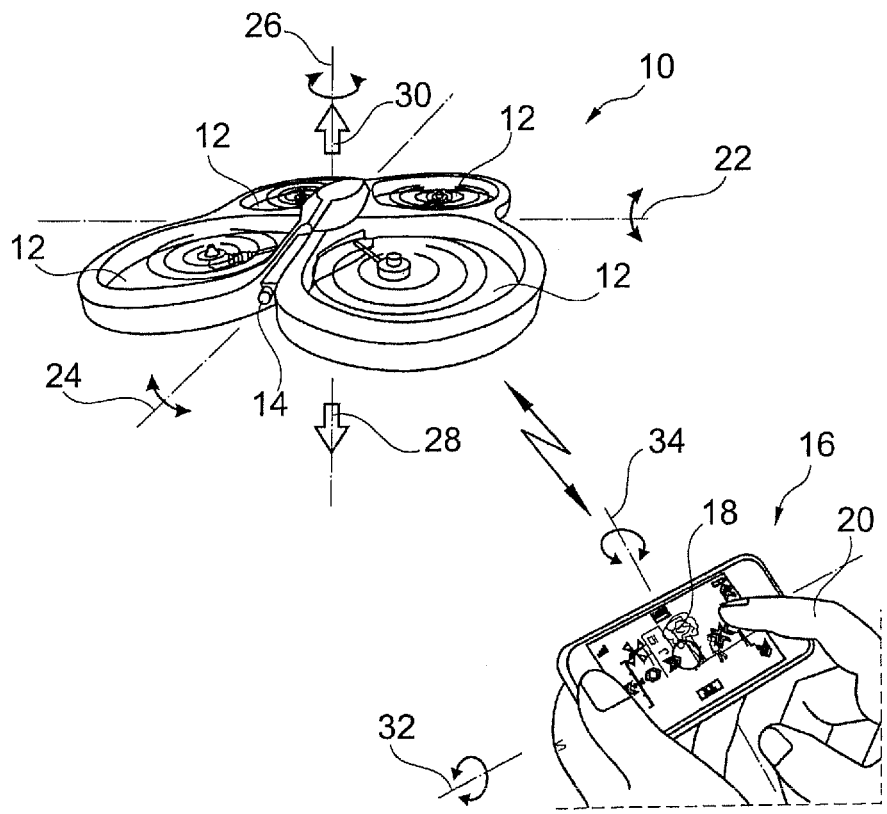
FIG. 1 is an overall view showing the drone and the associated apparatus making it possible to remotely pilot the latter.

In FIG. 1, the reference 10 designates, generally, a drone, which is for example a quadricopter such as the AR.Drone model from Parrot SA, Paris, France, described notably in WO 2010/061099 A2 and EP 2 364 757 A1 mentioned above, as well as in WO 2009/109711 A2 (which describes an exemplary automatic stabilization system based on information supplied by an altimeter and a front-viewing camera) and FR 2 915 569 A1 (which notably describes the control system with gyrometers and accelerometers used by the drone).

The drone 10 comprises four coplanar rotors 12, whose motors are piloted independently by an integrated navigation and attitude control system. It is provided with a front-viewing first camera 14 that makes it possible to obtain an image of the scene towards which the drone is directed, for example a wide-angle camera with CMOS sensor. The drone also comprises a vertical-viewing second camera (not represented) pointing downward, suitable for picking up successive images of the terrain being flown over and used notably to evaluate the speed of the drone in relation to the ground.

Inertial sensors (accelerometers and gyrometers) make it possible to measure with a certain accuracy the angular speeds and the attitude angles of the drone, that is to say the Euler angles describing the inclination of the drone. An ultrasound range finder arranged under the drone also supplies a measurement of the altitude in relation to the ground. As for the linear translational speed of the drone, the latter is evaluated by analysis of the image supplied by the vertical-viewing camera of the drone in combination with the accelerometric data, by virtue of software which estimates the displacement of the scene picked up by the camera from one image to the next and applies to this estimated displacement a scale factor that is a function of the measured altitude.

The drone 10 is piloted by a remote control apparatus 16 provided with a touchscreen 18 displaying the image taken by the front-mounted camera 14, with, superimposed, a certain number of symbols making it possible to activate the piloting commands by simple contact by the finger 20 of a user on the touchscreen 18. The apparatus 16 is provided with radio link means with the drone for the bidirectional exchange of data from the drone 10 to the apparatus 16, notably for the transmission of the image picked up by the camera 14, and from the apparatus 16 to the drone 10 for the sending of piloting commands. This link can, for example, be of Wi-Fi (IEEE 802.11) or Bluetooth (registered trademarks) local area network type.

The apparatus 16 is also provided with inclination sensors making it possible to control the attitude of the drone by transmitting to the apparatus corresponding inclinations according to the roll and pitch axes (reference can be made to WO 2010/061099 A2 mentioned above for more details on these aspects of the system).

As indicated in the introduction, the remote control apparatus 16 advantageously consists of a telephone or portable multimedia device with touchscreen and integrated accelerometer, for example a cellular telephone of iPhone type, a portable device of iPod Touch type or a multimedia tablet of iPad type, which are apparatuses that incorporate the various control members necessary for the display and the detection of the piloting commands, for the viewing of the image picked up by the front-mounted camera, and for the bidirectional exchange of data with the drone by Wi-Fi or Bluetooth link.

Piloting the drone 10 consists in moving the latter around by:

a) rotation about a pitch axis 22, to have it move forward or backward; and/or b) rotation about a roll axis 24, to shift it to the right or to the left; and/or c) rotation about a yaw axis 26, to make the main axis of the drone, and therefore the direction of pointing of the front-mounted camera, pivot to the right or to the left; and/or d) translation downward 28 or upward 30 by changing the throttle speed, so as to respectively reduce or increase the altitude of the drone.

When these piloting commands are applied by the user from the remote control apparatus 16 according to the known piloting mode, the commands a) and b) for pivoting about pitch 22 and roll 24 axes are obtained by inclinations of the apparatus 16 respectively about its longitudinal axis 32 and its transverse axis 34: for example, to make the drone move forward, it is sufficient to incline the apparatus forward by tilting it about the axis 32, to shift it to the right, it is sufficient to incline the apparatus by tilting it about the axis 34 to the right, and so on.

The commands c) and d), for their part, result from actions applied by contact of the finger 20 of the user (generally the right finger) on corresponding specific areas of the touchscreen 18.

The drone also has an automatic and standalone system for stabilization in stationary flight, corresponding to an autopiloted mode activated notably as soon as the user removes his finger from the touchscreen of the apparatus, or automatically at the end of the take-off phase, or even in case of interruption of the radio link between the apparatus and the drone. The drone then switches to a lift state in which it will be immobilized and held in this fixed position by the automatic piloting and stabilization system, with no intervention from the user.

The object of the technique proposed by the invention is to facilitate the piloting of the drone by making it possible for the user not to be concerned with the orientation of the drone during the piloting maneuvers thereof.

Figure 2:
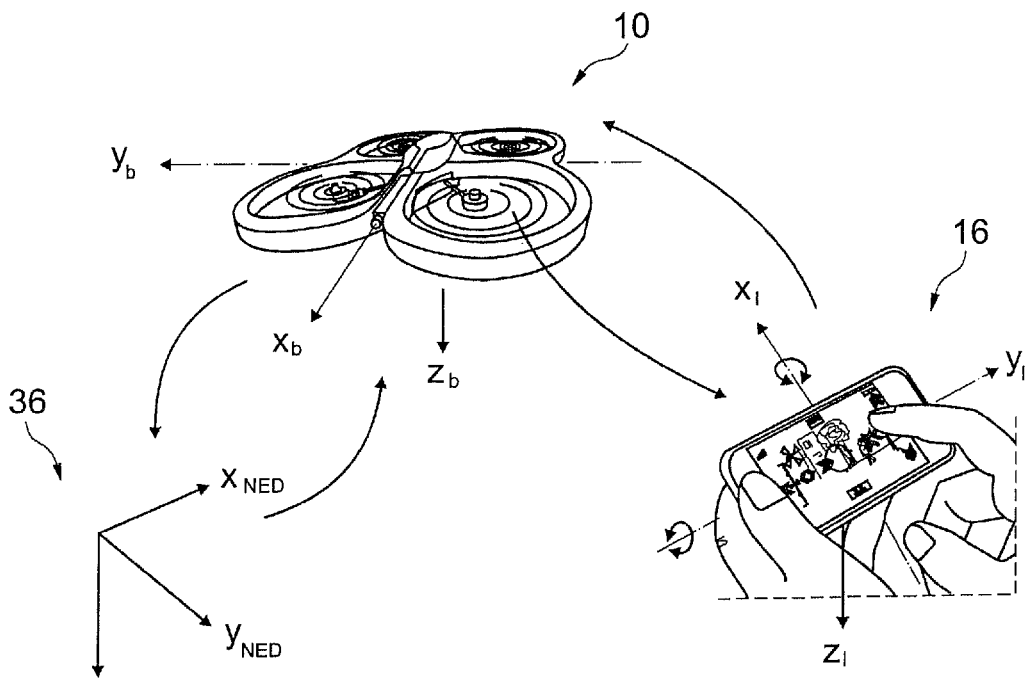
FIG. 2 shows the various reference frames considered by the method of the invention: absolute geographic reference frame, reference frame specific to the drone, reference frame specific to the apparatus.

FIG. 2 illustrates the various reference frames considered for the implementation of the invention:

with regard to the drone 10, a local reference frame $\{X_b, Y_b, Z_b\}$ linked to the body of the drone will be considered. The drone, although greatly symmetrical by construction, comprises a front and a rear, and the position of the camera will be considered to be pointing forward, thus defining the axis $X_b$. The axis $Y_b$ is at right angles to $X_b$ in the median plane of the drone, and the axis $Z_b$ is the vertical axis directed toward the ground;

with regard to the apparatus 16, the latter is also defined by a specific local reference frame $\{X_l, Y_l, Z_l\}$, $X_l$ and $Y_l$ corresponding to the direction widthwise and lengthwise, respectively, of the casing of the remote control and $Z_l$ corresponding to the normal to the plane $X_l Y_l$;

in addition to these two local reference frames (drone 10 and apparatus 16), a global reference frame 36 will also be considered, which is a fixed absolute reference frame, notably a geographic reference frame $\{X_{NED}, Y_{NED}, Z_{NED}\}$ of NED (North East Down) type. This absolute reference frame is advantageously a geomagnetic reference frame, the axis $X_{NED}$ corresponding to the direction of the magnetic north, which will be able to be determined in a manner that will be explained later, with reference to FIGS. 6 to 8; the direction $Y_{NED}$ is the direction parallel to the plane of the ground at right angles to the geographic north (that is to say geographic east), and the direction $Z_{NED}$ is at right angles to the plane of the ground and oriented downward.

There are thus three reference frames, with two local reference frames $\{X_b,Y_b,Z_b\}$ and $\{X_l,Y_l,Z_l\}$, which are mobile in relation to a global reference frame $\{X_{NED}, Y_{NED}, Z_{NED}\}$.

If ψ, θ and φ are used to designate the commands applied to the drone:

ψ corresponds to a rotation about the axis $Z_{NED}$,

θ corresponds to a rotation about the axis $Y_{NED}$ turned by ψ, and

φ corresponds to a rotation about the axis $X_b$.

With these conventions, the realignment of reference frame $\{X_b,Y_b,Z_b\}$ of the drone in relation to the geographic reference frame $\{X_{NED},Y_{NED},Z_{NED}\}$ will be able to be expressed by a matrix of the form:

$$R = \begin{bmatrix} \cos\theta\cos\psi & \sin\theta\sin\varphi\cos\psi - \sin\psi\cos\varphi & \cos\psi\sin\theta\cos\varphi + \sin\varphi\sin\psi \\ \sin\psi\cos\theta & \sin\theta\sin\varphi\sin\psi + \cos\psi\cos\varphi & \sin\theta\cos\varphi\sin\psi - \sin\varphi\cos\psi \\ -\sin\theta & \cos\theta\sin\varphi & \cos\theta\cos\varphi \end{bmatrix}$$

For the realignment of the reference frame $\{X_l,Y_l,Z_l\}$ of the apparatus 16, a comparable transformation is applied, based on the angles defining the orientation of the apparatus 16 in relation to the absolute reference frame $\{X_{NED},Y_{NED}, Z_{NED}\}$.

The reverse switch from the global geographic reference frame to the local reference frame of the drone is obtained by means of a matrix which will be the transpose of the matrix R.

Figure 3A:
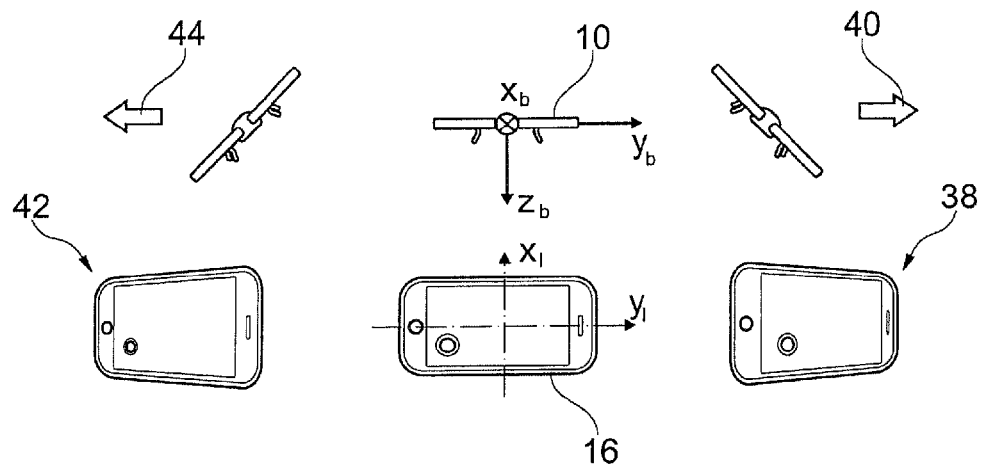
FIGS. 3a to 3c illustrate the effect of the inclination commands transmitted to the apparatus to pilot the drone, respectively in the case of the prior art (FIGS. 3a and 3b) and in the case of the invention (FIG. 3c).
Figure 3B:
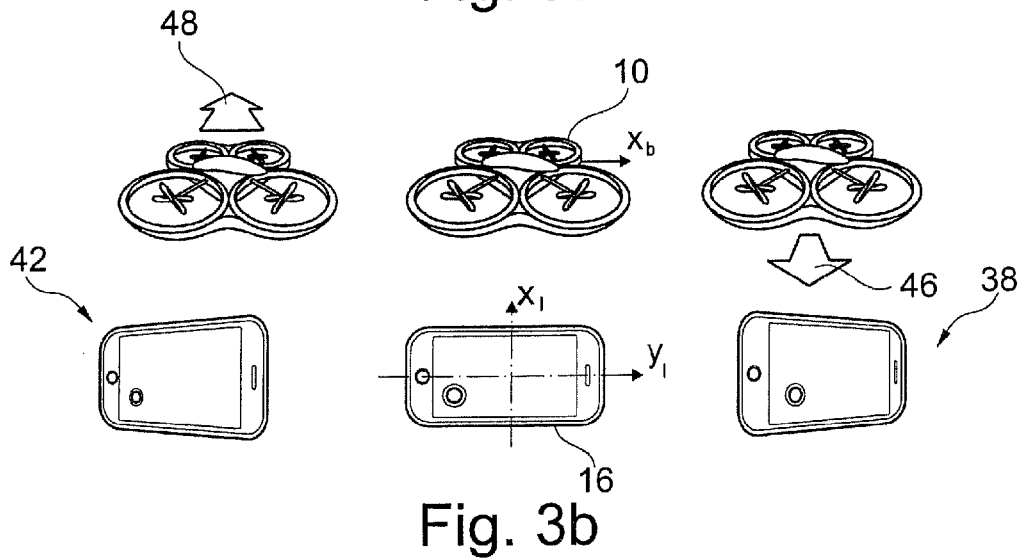
Figure 3C:
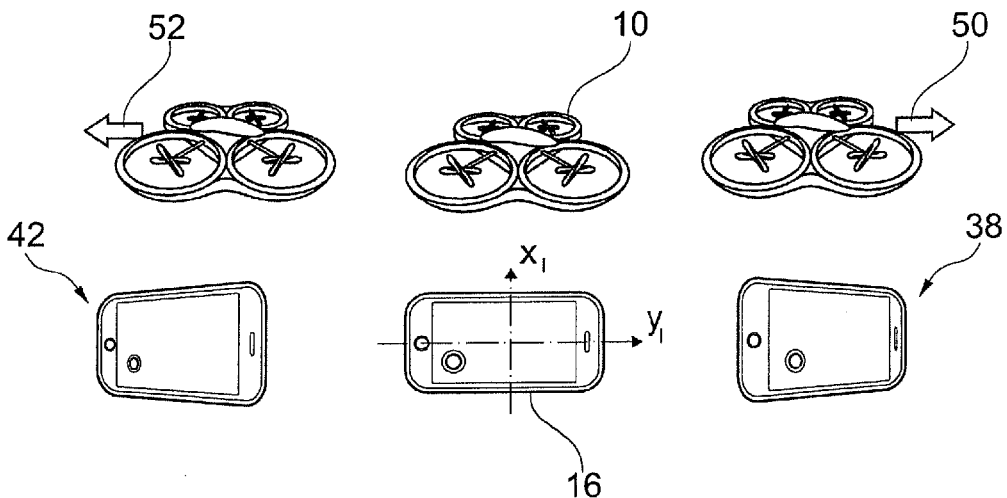

The purpose of the mutual realignment of the different reference frames is to overcome the difficulty illustrated in FIGS. 3a to 3c.

In the situation illustrated in FIG. 3a where the axis of advance $X_b$ of the drone is substantially the same as the corresponding axis $X_l$ of the apparatus, and oriented in the same direction, the tilting to the right (as in 38) of the apparatus will provoke a corresponding tilting of the drone, which will move the latter to the right (arrow 40), therefore in the same direction as the inclination of the apparatus 16. Similarly, a tilting to the left of the apparatus (as in 42) will provoke a displacement to the left of the drone (arrow 44).

On the other hand, as illustrated in FIG. 3b, if the drone is turned by 90° in relation to the position of FIG. 3a, that is to say if its direction $X_b$ is oriented to the right (and is displaced, in relation to the user, from left to right), then an inclination 38 of the apparatus to the right will provoke a tilting of the drone in the same direction, in the local reference frame of the drone, which will be reflected, in relation to the user, in a displacement in the direction of a convergence of the drone with the user (arrow 46). Similarly, a tilting of the apparatus to the left (as in 42) will provoke a displacement in the direction taking the drone away from the user (arrow 48). This command, suitable for immersive piloting, is not intuitive if the user is looking at the drone.

Along the same lines, if the movement of the drone is a movement toward the user (that is to say that the axes $X_b$ and $X_l$ are substantially aligned but oriented in reverse directions), a tilting of the apparatus to the right will lead to a tilting of the drone to the left, and vice versa.

To allow for a more intuitive piloting, without these effects of swapping over of the pitch and roll axes (as in the case described in FIG. 3b) or of reversal of the direction of the commands, the invention proposes to apply a change of reference frame to restore the intuitive commands.

The effect of these intuitive commands is illustrated in FIG. 3c: regardless of the orientation of the drone, a tilting to the right of the apparatus (command 38) will provoke a displacement to the right of the drone (arrow 50), and a tilting to the left (command 42) a displacement of the drone to the left (arrow 52), and similarly for the forward or backward tiltings of the apparatus 16.

Essentially, the invention exploits the presence, both in the apparatus 16 and in the drone 10, of sensors (of magnetometer type) enabling each of them to know its own orientation in an absolute reference frame, namely the NED reference frame or geomagnetic reference frame defined previously. Thus, when the user tilts the apparatus toward him, the drone will be displaced in the direction toward which the apparatus is pointing, regardless of the specific orientation of the drone; similarly, if the user tilts his apparatus to the right, the drone will be displaced to the right of the user, regardless of its own orientation (as illustrated in FIG. 3c).

The technical elements making it possible to produce this command will now be detailed.

Figure 4:
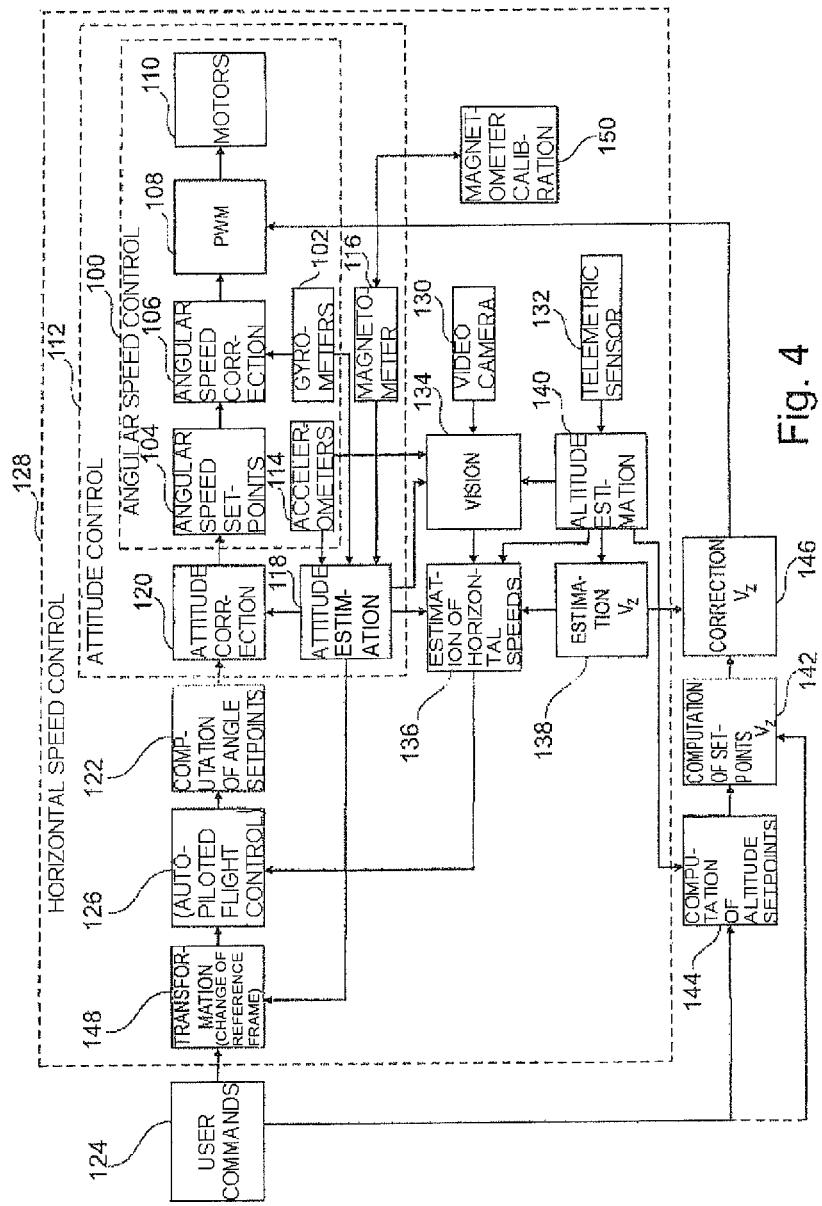
FIG. 4 is a block diagram of the various control, servo control and assisted piloting members of the drone.

FIG. 4 is a functional block diagram of the various control and servo control members of the drone. It will be noted that, although this diagram is presented in the form of interconnected circuits, the implementation of the various functions is essentially software, this representation is solely illustrative.

The piloting system involves a number of nested loops, for the control of the horizontal speed, of the angular speed and of the attitude of the drone, in addition to the control of the altitude variations automatically or under the effect of a command from the user.

The most central loop, which is the loop 100 for controlling the angular speed, uses, on the one hand, the signals supplied by the gyrometers 102 and on the other hand a reference consisting of the angular speed setpoints 104, these various information items being applied as input for an angular speed correction stage 106. This stage 106 pilots a stage 108 for controlling the motors 110 in order to separately control the speed of the different motors to correct the angular speed of the drone by the combined action of the rotors driven by these motors.

The angular speed control loop 100 is nested in an attitude control loop 112, which operates on the basis of the information supplied by the gyrometers 102, accelerometers 114 and a magnetometer 116, these data being applied as input for an attitude estimation stage 118 of non-linear merging type equivalent to a complementary filtering. The stage 118 delivers angular speed setpoints applied to an attitude correction circuit 120 of PI (proportional-integral) type, which also receives angle setpoints generated by a circuit 122 from user commands 124 which are either directly applied to the circuit 122, or modified or replaced by automatic piloting commands generated by a circuit 126, notably in automatic stabilization mode or during autopiloted transition phases.

Thus, from the error between the setpoint (applied by the user or else generated internally in the case of automatic piloting) and the measurement of the angle given by the attitude estimation circuit 118, the attitude control loop 112 calculates an angular speed setpoint using the PI corrector of the circuit 120. The angular speed control loop 100 then computes the difference between the preceding angular speed setpoint and the angular speed actually measured by the gyrometers 102. It then computes, from these information items, the different rotation speed setpoints (and therefore lift force setpoints) to be sent to the motors 110 of the drone to produce the maneuver initially requested by the user, or else scheduled by the automatic pilot.

For the control of the horizontal speed, notably in autopiloted operation, a loop 128 implements a vertical video camera 130 and a range-finding sensor 132 serving as altimeter, which produce information applied to a circuit 134 also receiving the data obtained from the gyrometers 102 to apply the necessary corrections to the estimation of the horizontal speed, given by the circuit 136. This estimation of the horizontal speed can be corrected by estimation of the vertical speed $V_Z$, given by the circuit 138 from an altitude estimation supplied by the circuit 140 receiving the information from the range-finding sensor 132.

For the autopiloted flight, the horizontal speed estimated by the circuit 136 makes it possible for the circuit 126 to compute speed setpoints which will then be applied as input for the attitude control loop 112 after transformation into angle setpoints by the circuit 122, to progressively bring the drone to a stop then hold the latter in a configuration with zero speed and inclination.

With regard to the vertical displacements of the drone, the user 124 applies either a lift speed setpoint $V_z$ directly to a circuit 42, or an altitude setpoint to a circuit 144 which computes, from the altitude estimation produced by the circuit 140, a lift speed setpoint applied to the circuit 142.

In one or other case, the lift speed (prescribed or computed) is applied to a circuit 146 comparing the setpoint lift speed $V_Z$ with the estimated corresponding speed, given by the circuit 138. This circuit 146 accordingly modifies the command data for the motors (circuit 108) so as to increase or reduce the rotation speed simultaneously on all the motors so as to minimize the difference between setpoint lift speed and measured lift speed.

Finally, and in a manner characteristic of the invention, a circuit 148 applies a change of reference frame to realign the specific reference frame of the drone on the specific reference frame of the apparatus.

More specifically, in the conventional piloting technique without realignment of the reference frame of the drone on that of the apparatus, that is to say in "immersive piloting" mode, the command takes the form:

$$\begin{pmatrix} \theta_d \\ \varphi_d \end{pmatrix} = \begin{pmatrix} \theta_I \\ \varphi_I \end{pmatrix}$$

$\theta_d$ and $\phi_d$ being the setpoint Euler angles of the drone in its specific reference frame, and
$\theta_I$ and $\phi_I$ being the Euler angles of the apparatus.

In other words, the setpoint angles of the drone correspond to the angles characterizing the attitude of the apparatus in its reference frame.

Here, and hereinbelow, these equalities are obviously given within a possible amplification factor, and with possible limitations of maximum inclination in one direction or in the other to avoid any command exceeding the physical capabilities of the drone.

In the case of the invention, a change of reference frame is performed to realign the specific reference frame of the drone on the specific reference frame of the apparatus and thus allow for an intuitive piloting, independent of the relative orientation of the drone in relation to the user, as the latter sees the drone.

As was indicated above, this transformation is applied in relation to an absolute reference frame, which here is advantageously Earth's geomagnetic reference frame, determined in the manner that will be explained below from data supplied by the magnetometer 116 after the latter has been the subject of a controlled calibration by the circuit 150.

To know the relative orientation of the drone in relation to the apparatus it is sufficient to know the absolute orientations of each of these two devices in relation to the ground, in particular in relation to the magnetic north of the NED geomagnetic reference frame.

Figure 5:
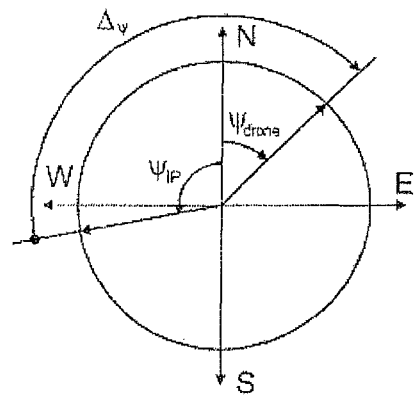
FIG. 5 illustrates how to determine the relative orientation of the drone in relation to the apparatus.

As illustrated in FIG. 5, the letter $\psi$ will be used to denote the headings, that is to say the oriented angles characterizing the orientation of the drone, or of the apparatus, in relation to the magnetic north in the NED reference frame.

With regard to the apparatus, the heading $\psi_{iP}$ is obtained by means of the magnetometer incorporated in the apparatus, rectified using the other inertial sensors of the apparatus.

With regard to the drone, the heading $\psi_{drone}$ is obtained by a combination of information supplied by the various sensors of the drone, including the magnetometer 116. How to obtain reliable information concerning the heading $\psi_{drone}$ will be seen below, with reference to FIGS. 6 to 8.

FIG. 5 is a plan view, parallel to the plane of the ground, of the NED reference frame showing the orientation of the heading $\psi_{iP}$ of the apparatus and of the heading $\psi_{drone}$ of the drone. If these two headings are assumed known (how they are determined will be seen below), the issue is to realign, by a rotation of angle $\Delta\psi = \psi_{iP} - \psi_{drone}$, the local reference frame of the drone on the local reference frame of the apparatus.

If $\theta_I$ and $\phi_I$ are used to designate the setpoint angles produced by the user, that is to say the inclinations transmitted to the apparatus according to the pitch and roll axes, it is demonstrated that the setpoint angles $\theta_d$ and $\phi_d$ which have to be applied to the drone are determined by the following system of two relationships:

$$\begin{cases} \theta_d = \tan^{-1}\left[\cos\Delta\psi \cdot \tan\theta_I + \sin\Delta\psi \cdot \frac{\tan\varphi_I}{\cos\theta_I}\right] \\ \varphi_d = \sin^{-1}[\cos\Delta\psi \cdot \sin\varphi_I - \sin\Delta\psi \cdot \sin\theta_I \cdot \cos\varphi_I] \end{cases}$$

$\Delta\psi$ being the difference of the respective heading angles of the apparatus and of the drone in relation to the north.

The implementation of this realignment therefore consists in performing a transformation dependent on $\Delta\psi$, $\theta_I$ and $\phi_I$ on the setpoint angles $\theta_d$ and $\phi_d$ of the apparatus In a first implementation, this operation is performed from the above equation system, completely and without simplification.

The corresponding computation can be performed equally within the drone and within the apparatus.

Preferably, these computations are performed within the drone because, of these two possibilities, it is the latter which is the most robust and which introduces the least latency.

In practice, if the drone receives from the apparatus the parameters $\theta_I$, $\phi_I$ and $\psi_{iP}$ (heading of the apparatus in its specific reference frame), and given the fact that it is capable of determining its own heading $\psi_{drone}$, then it has all the parameters enabling it to compute the realigned setpoint angles $\theta_d$ and $\phi_d$.

On the other hand, if the computation is performed within the apparatus, it will be necessary for the drone to transmit its heading $\psi_{drone}$ to the apparatus, which will locally compute the realigned angles $\theta_d$ and $\phi_d$ and will send them to the drone to command the motors thereof: in this case, there will be two data transmissions (from the drone to the apparatus then from the apparatus to the drone), which will increase the latency time compared to the preceding solution which required only a single data transmission (from the apparatus to the drone).

The computation of the new realigned setpoint angles within the drone also makes it possible to simplify the work of the third-party developers, for example for the programming of games run within the apparatus and implementing the piloting mode according to the invention: if all the computations are performed within the drone, the developer will not need to know the mode of computation of the realigned setpoint angles, executed entirely within the internal software of the drone.

Finally, the choice of performing the computation within the drone reduces the consequences of transient communication outages on the link between the drone and the apparatus, since only a single data transfer is necessary and not a go and return of commands, as in the case where the computation is performed within the apparatus (see above).

In a second implementation, the exact command given by the system of two equations above is replaced by a simplified form, valid for an approximation with small angles:

$$\begin{pmatrix} \theta_d \\ \varphi_d \end{pmatrix} = \begin{pmatrix} \cos\Delta\psi & \sin\Delta\psi \\ -\sin\Delta\psi & \cos\Delta\psi \end{pmatrix} \begin{pmatrix} \theta_I \\ \varphi_I \end{pmatrix}$$

This implementation can be performed by a transformation dependent only on $\Delta\psi$ on the angles $\theta_I$ and $\varphi_I$ of the apparatus, before applying the latter to the servo control loop of the drone.

This transformation can be broken down into two rotations, one being performed within the apparatus, and the other within the drone. Thus, neither of these two devices will need to know the heading of the other.

The first rotation, of angle $\psi_{iP}$, is performed within the apparatus, and returns an intermediate command $\theta'_I$ and $\varphi'_I$:

$$\begin{pmatrix} \theta'_I \\ \varphi'_I \end{pmatrix} = \begin{pmatrix} \cos\psi_{iP} & \sin\psi_{iP} \\ -\sin\psi_{iP} & \cos\psi_{iP} \end{pmatrix} \begin{pmatrix} \theta_I \\ \varphi_I \end{pmatrix}$$

This intermediate command is sent to the drone, which computes, from its own heading angle datum $\psi_{drone}$, a rotation of angle $-\psi_{drone}$ giving the final angle setpoint $\theta_d$, $\varphi_d$:

$$\begin{pmatrix} \theta_d \\ \varphi_d \end{pmatrix} = \begin{pmatrix} \cos\psi_{drone} & -\sin\psi_{drone} \\ \sin\psi_{drone} & \cos\psi_{drone} \end{pmatrix} \begin{pmatrix} \theta'_I \\ \varphi'_I \end{pmatrix}$$

There now follows a description of a way to determine the magnetic heading $\psi_{drone}$ of the drone.

In concrete terms, this heading value $\psi_{drone}$ is obtained from information delivered by a plurality of onboard sensors including the magnetometer 116, but also the gyroscopic unit 102 in order to compensate a certain number of disturbances induced by the drone itself (high currents circulating in the conductors, magnet of the motors etc.) and due to the imperfections of the measurement (bias of the sensor, high measurement noise).

Figure 6:
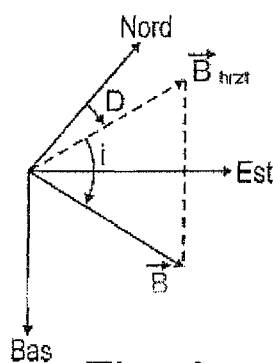
FIG. 6 illustrates the various components of the Earth's magnetic field, and their orientation in relation to a geographic reference frame of the Earth.

It involves measuring the orientation of the drone in relation to the Earth's geomagnetic reference frame. Locally, the Earth's magnetic field on the surface of the globe produces a vector B which can be characterized, as illustrated in FIG. 6, by:

its magnitude (measured in milligauss),
its declination D in relation to the geographic north, and
its inclination I in relation to the plane of the horizontal (geographic north, geographic east).

The declination, which is generally fairly low, has no influence for the implementation of the e invention, in as much as the chosen reference frame is a geomagnetic reference frame and the aim is to determine the direction of the magnetic north and not that of the geographic north (unimportant here).

The inclination I, on the other hand, can take relatively high values, positive or negative, for example of the order of 65° downward (magnetic tip) in Paris.

The amplitude of the Earth's magnetic field B varies typically by 200 to 600 mG depending on the geographic position, with an amplitude of the horizontal component of the magnetic field $B_{hrzt}$, varying from 0 to 300 mG according to the local amplitude of the field B and the local inclination I. It is this component $B_{hrzt}$ th at has to be determined, which will make it possible to estimate the heading $\psi_{drone}$ of the drone in relation to the magnetic north.

The vertical component $B_{hrzt}$ of the magnetic field can be estimated from the magnitude of the horizontal component and of the inclination I of the magnetic field. The inclination of the magnetic field will be determined by a mapping table loaded into the memory of the drone, which will give, for the latitude and longitude values (determined for example by a GPS circuit incorporated in the apparatus, or by any other means), the angle of inclination of the Earth's magnetic field vector B in relation to the horizontal.

However, the magnetic heading given by the magnetometer of the drone is effected by many interfering components.

Firstly, there is a relatively significant interfering component in the high frequencies, because of the magnets of the motors of the drone. Since these magnets are rotating, their contribution to the magnetic field also rotates with them, inducing an interfering component in the high frequencies (that is to say, in the frequencies of the order of the speed of rotation of the motors and above).

To eliminate this first source of interferences, the magnetic heading of the drone is advantageously obtained, as illustrated in FIG. 7, by combining (i) the low-frequency component of the rough magnetic heading produced by the magnetometer 116, which is unreliable in the high frequencies, with (ii) the high-frequency components of the gyroscopic sensor 102.

This combination is performed by two complementary filters 152, 154, respectively low-pass and high-pass with transfer functions $H_{LP}$ and $H_{HP}$ exhibiting the property of complementarity $H_{LP}+H_{HP}=1$. The resultant signals are merged in 156 to give a heading value stripped of the variable high-frequency interfering elements.

This technique makes it possible to reconstruct the heading datum while filtering the defects of the other sensors. The reliability at low frequency and the absolute component of the magnetometric measurement are thus advantageously exploited, while retaining the quality of the dynamic measurement by virtue of the high frequencies of the gyroscopic measurement. The problems of high-frequency noises, significant on the magnetometric sensors, are thus filtered. Problems of temperature drift and those linked to the mathematic integration of the data from the inertial sensors of gyroscopic type are also compensated.

The measurements delivered by the magnetometer are, however, affected by other disturbances produced by the environment of the sensor, notably:
the magnetic fields generated by the high power supply currents of the motors;

the magnetic fields generated by the fixed magnets present on the drone (for example, the magnet of the magnetic fastening for the protective fairing), these magnets not being rotating; and the specific offset of the magnetometric sensor.

These disturbances are of the same order of magnitude as the Earth's magnetic field itself, and it is therefore necessary to eliminate them in order to determine the magnetic heading of the drone with sufficient accuracy. These various disturbances are added and constitute a global offset, which will be able to be estimated by means of a preliminary calibration procedure that will now be described.

The disturbances cited above have the characteristic of being fixed in the reference frame of the drone. It is this property which will be used to estimate them and eliminate them from the measurement.

The calibration procedure consists in having the drone rotate automatically by one revolution on itself, flat and in flight (rotation of 360° about the yaw axis of the drone). The measured magnetometric data are therefore the sum of the offset and of the external magnetic field. However, the offset is intrinsically constant in the reference frame of the drone, whereas the external magnetic field (the Earth's magnetic field that is to be determined) will have performed a complete revolution in this same reference frame.

FIG. 8 illustrates an example of recording of measurements from the magnetometric sensor. In the plane of the measurements, a cloud of points is obtained forming a circle centered on the global offset, at C, and of radius R corresponding to the component of the Earth's magnetic field.

From the measurements performed, the center C and the radius R of the circle can be obtained by the application of a recursive optimization algorithm based on the least squares method, of a type that is known per se; it involves, based on different sets of values corresponding to the measurement points, searching for the best center and the best radius minimizing an error function.

The offset to be deduced in the horizontal plane of the drone in relation to the magnetometric measurements supplied is thus obtained.

When it comes to the offset in the vertical direction, the latter can be determined from the radius R estimated previously, the measurement values obtained during the calibration phase, and the local value of the inclination, known from a table of values loaded into the memory of the drone.

If $B_{hrzt}$ is used to designate the horizontal component of the magnetic field and $B_{vert}$ the vertical component of this same field, the latter has the value: $B_{vert}=B_{hrzt} \cdot \tan(\text{inclination}) = R \cdot \tan(\text{inclination})$, the value of the inclination I being obtained from the table loaded into memory.

Now, on the vertical axis, the measured magnetic field $P_{mes}$ is assigned a bias $Z_0$ such that $B_{mes} = Z_0 + B_{vert}$.

This bias $Z_0$ can be estimated by using the set of calibration measurements: $Z_0 = \overline{B_{mes}} - R \cdot \tan(\text{inclination})$, $\overline{B_{mes}}$ representing the average of the measurements of the magnetic field on the vertical axis Z during the calibration measurement.

The magnetic heading is then obtained by compensating the magnetic measurement of the pitch and roll angles, then by extracting the heading given by the horizontal component of the compensated measurement:

$$\vec{B}_{comp} = \begin{pmatrix} B_{compX} \\ B_{compY} \\ B_{compZ} \end{pmatrix}$$
$$= R_{\theta_d} \cdot R_{\varphi_d} \left( \begin{pmatrix} M_X \\ M_Y \\ M_Z \end{pmatrix} - \begin{pmatrix} X_0 \\ Y_0 \\ Z_0 \end{pmatrix} \right)$$

$$\psi_{mag} = -\tan^{-1}\left(\frac{B_{compY}}{B_{compX}}\right)$$

$M_X$, $M_Y$, $M_Z$ representing the rough values obtained from the magnetometric measurement, and $B_{compX}$, $B_{compY}$ and $B_{compZ}$ representing the useful values, projected into the horizontal plane.

The invention claimed is:

1. A method for piloting, by means of a remote control apparatus, a rotary wing drone with multiple rotors driven by respective motors that can be controlled in a differentiated manner to pilot the drone attitude-wise and speed-wise, comprising the following steps:

by the apparatus (16):
inclination of the apparatus according to the pitch (32) and roll (34) axes of this apparatus, and production of corresponding inclination signals ($\theta_I$, $\phi_I$); and
transformation of these inclination signals of the apparatus into piloting commands and sending of these commands to the drone, and by the drone (10):
reception of the piloting commands and generation from these commands of setpoint values ($\theta_d$, $\phi_d$) for a drone motor control loop, these setpoint values being suitable for controlling the attitude of the drone according to the pitch (22) and roll (24) axes of the drone, wherein this method comprises the following additional steps:
acquisition of first orientation data ($\psi_{iP}$) of a local reference frame linked to the apparatus ($X_I Y_I Z_I$) in relation to an absolute reference frame linked to the ground ($X_{NED} Y_{NED} Z_{NED}$);
acquisition of second orientation data ($\psi_{drone}$) of a local reference frame linked to the drone ($X_b Y_b Z_b$) in relation to said absolute reference frame ($X_{NED} Y_{NED} Z_{NED}$);
computation of a relative angular orientation datum ($\Delta\psi$) of the drone in relation to the apparatus, from said first and second orientation data; and
realignment of the reference frame of the apparatus on the reference frame of the drone, by application to the piloting commands of a rotation that is a function of said relative angular orientation datum, so as to thus produce realigned setpoint values according to the pitch and roll axes of the drone which are a function of the inclinations, applied to the apparatus by the user according to the pitch and roll axes thereof, considered in the local reference frame linked to the apparatus and no longer in that linked to the drone.

2. The method of claim 1, in which the first and the second orientation data are obtained from respective heading angles ($\psi_{drone}$, $\psi_{iP}$) of the apparatus and of the drone in relation to the north.

3. The method of claim 2, in which said rotation that is a function of said relative angular orientation datum is of the type:

$$\begin{pmatrix} \theta_d \\ \varphi_d \end{pmatrix} = \begin{pmatrix} \cos\Delta\psi & \sin\Delta\psi \\ -\sin\Delta\psi & \cos\Delta\psi \end{pmatrix} \begin{pmatrix} \theta_I \\ \varphi_I \end{pmatrix}$$

$\theta_d$ and $\varphi_d$ being the realigned setpoint values according to the pitch and roll axes in the local reference frame linked to the drone, $\theta_I$ and $\varphi_I$ being the inclinations applied according to the pitch and roll axes in the local reference frame linked to the apparatus, and $\Delta\psi$ being the difference of the respective heading angles of the apparatus and of the drone in relation to the north.

4. The method of claim 3, in which the computation of said rotation is performed within the drone, directly from data received from the apparatus, these data comprising the values of the inclinations applied to the apparatus and a heading angle datum of the apparatus.

5. The method of claim 2, in which said rotation that is a function of said relative angular orientation datum is of the type:

$$\begin{cases} \theta_d = \tan^{-1}\left[\cos\Delta\psi \cdot \tan\theta_I + \sin\Delta\psi \cdot \dfrac{\tan\varphi_I}{\cos\theta_I}\right] \\ \varphi_d = \sin^{-1}[\cos\Delta\psi \cdot \sin\varphi_I - \sin\Delta\psi \cdot \sin\theta_I \cdot \cos\varphi_I] \end{cases}$$

$\theta_d$ and $\varphi_d$ being the realigned setpoint values according to the pitch and roll axes of the drone, $\theta_I$ and $\varphi_I$ being the inclinations applied according to the pitch and roll axes of the apparatus, and $\Delta\psi$ being the difference of the respective heading angles of the apparatus and of the drone in relation to the north.

6. The method of claim 5, in which the computation of said rotation is performed partially within the apparatus and partially within the drone with:

within the apparatus, computation of a first rotation from the values of the inclinations $\theta_I$ and $\varphi_I$ applied to the apparatus and of a heading angle datum $\psi_{iP}$ of the apparatus:

$$\begin{pmatrix} \theta'_I \\ \varphi'_I \end{pmatrix} = \begin{pmatrix} \cos\psi_{iP} & \sin\psi_{iP} \\ -\sin\psi_{iP} & \cos\psi_{iP} \end{pmatrix} \begin{pmatrix} \theta_I \\ \varphi_I \end{pmatrix}$$

within the drone, computation of a second rotation from a heading angle datum $\psi_{drone}$ of the drone:

$$\begin{pmatrix} \theta_d \\ \varphi_d \end{pmatrix} = \begin{pmatrix} \cos\psi_{drone} & -\sin\psi_{drone} \\ \sin\psi_{drone} & \cos\psi_{drone} \end{pmatrix} \begin{pmatrix} \theta'_I \\ \varphi'_I \end{pmatrix}$$

7. The method of claim 2, in which the absolute reference frame linked to the ground is a geomagnetic reference frame, and the heading angles are the angles measured in relation to the magnetic north.

8. The method of claim 7, in which the determination of the heading angle of the drone comprises the acquisition of a magnetic heading measurement delivered by a magnetometric sensor (116) of the drone.

9. The method of claim 8, in which the heading angle of the drone is acquired by the combination:

of a magnetic heading measurement delivered by a magnetometric sensor (116) of the drone with application of a low-pass filtering (152), and of a gyroscopic heading measurement delivered by an inertial unit of the drone (102) with application of a high-pass filtering (154) complementing said low-pass filtering.

10. The method of claim 8, also comprising a preliminary step of calibration of the magnetometric sensor of the drone.

11. The method of claim 10, in which said calibration step comprises the substeps of:

ordering a complete rotation of the drone in flight, flat around a yaw axis;

recording of the measurements delivered by the magnetometric sensor;

determination of a global offset value representative of the surrounding disturbing magnetic fields and of the specific offset of the magnetometric sensor.

* * * * *